US006785439B2

(12) United States Patent
Hoke et al.

(10) Patent No.: US 6,785,439 B2
(45) Date of Patent: Aug. 31, 2004

(54) SWITCHING USING THREE-DIMENSIONAL REWRITEABLE WAVEGUIDE IN PHOTOSENSITIVE MEDIA

(75) Inventors: Charles D. Hoke, Menlo Park, CA (US); Brian E. Lemoff, Union City, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 286 days.

(21) Appl. No.: 10/060,512

(22) Filed: Jan. 29, 2002

(65) Prior Publication Data

US 2003/0142898 A1 Jul. 31, 2003

(51) Int. Cl.[7] .............................................. G02B 6/026
(52) U.S. Cl. ........................................ 385/17; 385/147
(58) Field of Search ............................. 385/31, 39, 52, 385/147, 11–24; 372/6, 31, 32; 65/385; 359/326

(56) References Cited

U.S. PATENT DOCUMENTS

| 5,194,079 A | 3/1993 | Tumminelli et al. ......... 65/3.11 |
| 5,381,251 A | * 1/1995 | Nonomura et al. ............ 349/24 |
| 5,699,462 A | 12/1997 | Fouquet et al. ................ 385/18 |
| 5,712,932 A | 1/1998 | Alexander et al. ............. 385/24 |
| 5,914,807 A | 6/1999 | Downing ...................... 359/326 |
| 5,943,160 A | 8/1999 | Downing ...................... 385/326 |
| 5,960,131 A | 9/1999 | Fouquet et al. ................ 385/17 |
| 6,055,344 A | 4/2000 | Fouquet et al. ................ 385/16 |
| 6,243,525 B1 | 6/2001 | Luizink et al. .............. 385/132 |

* cited by examiner

Primary Examiner—Akm Enayet Ullah

(57) ABSTRACT

A three-dimensional optical switch using three-dimensional rewritable waveguides in a photosensitive substrate. At least two light beams are used to illuminate the substrate in the region where the waveguide is to be written. The refractive index of the substrate changes at the points where the beams intersect. Therefore, the light beams can be directed to create a three-dimensional waveguide in the photosensitive substrate. A plurality of inlet ports in one surface of the substrate are thereby connected to a plurality of outlet ports on another surface of the substrate. Alternatively, the inlet ports and the outlet ports may be on the same surface of the substrate. The invention also provides methods of creating waveguides in photosensitive media using the device described herein.

27 Claims, 1 Drawing Sheet

SWITCHING USING THREE-DIMENSIONAL REWRITEABLE WAVEGUIDE IN PHOTOSENSITIVE MEDIA

BACKGROUND

1. Field of the Invention

The present invention relates generally to optical waveguide based switches and more particularly to a three-dimensional, rewriteable, waveguide switch in a photosensitive medium.

2. Discussion of the Related Art

Fiber optic networks for transmission of optical signals have come into wide use for telecommunications and data communications in recent years. These fiber optic networks need rapid, efficient and effective switching apparatus to switch one or more incoming channels to one or more other channels within the network. Several switching techniques and structures have been developed in recent years that are satisfactory for many applications for switching one or more incoming channels from one or more paths to one or more other paths. However, in general these are not entirely satisfactory for many applications, including large cross-connect switches.

Several cross-connect switches using a waveguide matrix have recently been developed. However these optical waveguide based matrix switches are based on two-dimensional, planar lightwave circuits (bubble switches) or free space switches using microelectromechanical systems (MEMS) (tilting mirrors). The waveguide approach overcomes some of the problems of the MEMS approach in that the device is minimally sensitive to mechanical vibrations and thermal fluctuations. However, the MEMS approach takes advantage of 2N(1XN) switching architecture and free space beam propagation in order to minimize losses that increase with port count. A number of switch structures of this type are disclosed in U.S. Pat. Nos. 5,699,462 and 5,960,131. In general, an optical signal must traverse between one and (2* N)–1 points in an N*N matrix switch.

Accordingly, there is a need for an improved waveguide based switch that has the advantages of both of the aforementioned approaches. The present invention satisfies this need and provides other related advantages as well.

SUMMARY OF THE INVENTION

It is one purpose of the present invention to provide a waveguide based matrix switch that overcomes the above problems of the prior art by providing a rewriteable, three-dimensional switch.

In one aspect of the invention, an optical switch has a photosensitive substrate with a plurality of surfaces, a plurality of inlet ports in one of the plurality of surfaces, and a plurality of outlet ports in another of the plurality of surfaces. It also has a source of at least two light beams, and a means for directing the light beams at a selected line of intersection drawn between one inlet port and one outlet port, thereby creating a waveguide.

In additional embodiments, the invention has a photosensitive substrate with at least one surface, at least one inlet port in one surface and at least one outlet port in the same surface of the substrate. It also has a source of one light beam, a means for splitting the light beam into at least two light beams, and a means for focusing the two light beams at a selected location line drawn between one inlet port and one outlet port, thereby creating at least one waveguide in the photosensitive substrate.

The invention also provides a method of forming a waveguide in a substrate by taking a three-dimensional photosensitive substrate having a plurality of planar surfaces, the photosensitive substrate comprising a plurality of inlet ports in one of the plurality of surfaces, and a plurality of outlet ports in another one of the plurality of surfaces. The method also includes adding a source of at least two light beams and focusing the light beams at a selected line of intersection drawn between one inlet port and one outlet port to change the refractive index of the photosensitive substrate at the line of intersection, thereby creating a waveguide in the substrate.

BRIEF DESCRIPTION OF THE DRAWING

The above and other objects, features and advantages of the invention will become more apparent from the following detailed description, when read in conjunction with the accompanying drawing, in which.

DETAILED DESCRIPTION OF PREFERRED EMBODIMENTS

Figure 1:
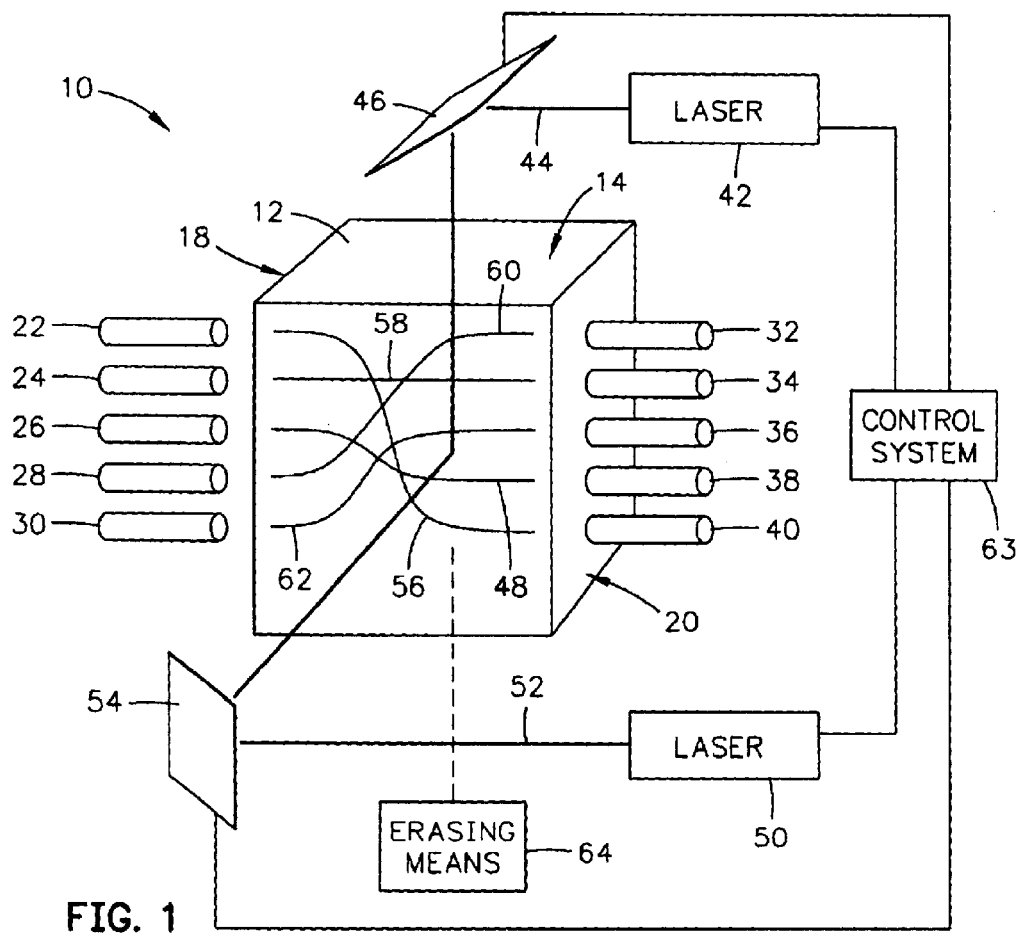
FIG. 1 is a perspective diagramatic illustration of a waveguide based matrix switch configured in accordance with the present invention.

Referring to FIG. 1 of the drawing, a perspective view of a waveguide based matrix switch in accordance with an exemplary embodiment of the invention is illustrated and designated generally by reference numeral 10. The illustrated embodiment comprises a generally rectangular three-dimensional body 12 preferably made of a photosensitive crystal. Body 12 may also be referred to as a substrate. In a preferred embodiment, the photosensitive crystal is comprised of a photorefractive material. The photorefractive material enables the forming of waveguides within the material using at least two beams. As used herein the term "photosensitive" refers to the characteristic of being reactive or sensitive to radiant energy, especially light. Also as used herein, the term "photorefractive" is applied to materials, which exhibit a change in index of refraction in response to incident radiant energy, especially light.

In the present invention, the focusing of laser beams within the material changes the refractive index of the photorefractive material where the lasers are focused. Thus, lasers can be used to write or draw a waveguide from an inlet point or port on one side of the body to another point or port on another side of the body. Preferably two light beams of different wavelengths are used herein to write or draw the waveguide. However, it will be understood that one light beam, or two light beams of the same wavelength, may also be used. The photorefractive material is also preferably erasable and rewritable so that the connections between ports on one side can be changed to other ports on the other side. One material that can be erased is lithium niobate, although it is understood by those skilled in the art that other suitable materials may be used, as long as they exhibit photorefractive properties and are erasable and rewritable. While preferred, erasability and rewritability are not essential or necessary aspects of the invention.

For example, in the case of lithium niobate, only one beam is required to change the refractive index. However, in this configuration the index change is relatively difficult to localize in three dimensions. Other more suitable photorefractive materials may exhibit no, or relatively little, refractive index change when only one laser beam or wavelength of light is present, but when two intersecting laser beams or two different wavelengths of light are employed, a relatively large index change may be produced where they cross. The typical index of refraction change between air and the photosensitive material is preferably about 0.5.

The embodiment illustrated in FIG. 1 shows a photorefractive material or body 12 having a plurality of substantially flat surfaces 14, 16, 18 and 20. Body 12 is shown as having a three-dimensional, rectangular, box-like configuration but it would be understood by those skilled in the art that the body may have any number of other configurations, as long as similar functionality is present. A plurality of optical fibers, for example glass fibers, which may be inputs or outputs 22, 24, 26, 28 and 30, are shown positioned to connect to ports (not shown) in surface 18. Another plurality of optical fibers, which may be inputs or outputs 32, 34, 36, 38 and 40, are shown connected to ports in surface 20. The ports will be constructed and sized accordingly. In one embodiment, fibers may be spaced at least 125 microns on center. However, in preferred embodiments the input and output fibers are about nine microns in diameter and are spaced about 250 microns apart from one another.

First laser 42 located on one side of body 12 is positioned to direct light beam 44 onto tiltable mirror 46 for directing the light beam along a path between a port on one side (for example, surface 18) of the body to a port on another side (for example, surface 20) of the body. The light beam is shown tracing path 48, for example, between input optical fiber 26 on side 18 of the photosensitive body to output optical fiber 38 on side 20 of the body. It is also contemplated herein that the radius of curvature of the waveguides is a factor in choosing the length of body 12. It is understood that the radius of the bend of the waveguide is inversely proportional to the amount of bending losses. At the bends, a certain amount of input energy is lost due to radiation or reflection. Therefore, it is desirable to reduce these effects by keeping the radii of the bends within optimal ranges. Those skilled in the art understand that these optimal ranges depend on the index of refraction difference between the waveguide and the surrounding material. For example, in embodiments where the index of refraction difference is relatively high, the radii of the waveguides may be less than 1 mm. However, in a preferred embodiment, the radii of the bends are between 1 and 5 mm. Thus, those skilled in the art are able to construct different length bodies without undue experimentation and determine whether functionality is retained. Other approaches to reducing bending losses are known, such as described, for example, in U.S. Pat. No. 6,243,525. It should also be noted that by designating one fiber as an "input" fiber, the possibility that it could function as an output fiber continues to exist.

Second laser 50, positioned on another side of photosensitive body 12, is positioned to direct light beam 52 onto tiltable mirror 54 for directing the light beam along a path between a port on one side of the body to a port on another side of the body, in a manner similar to the manner the beam from laser 42 is directed. A tiltable mirror is an example of a means for directing a light beam. Those skilled in the art will understand that other structures such as prisms may comprise a means for directing a light beam. This process can then be repeated such that the switch is "rewritable." In most instances the beams will be directed to a common point to simultaneously trace along a common path. Where the light beams intersect, an area of higher refractive index is formed, which remains after the light beams are removed, either until it is erased or until it dissipates or fades over a period of time. Paths may be traced in some photorefractive materials, such as lithium niobate, with a single beam of light, while other requires two beams of different frequency. Particularly preferable photorefractive materials for body 12 are selected so that the refractive index will change where two of the light beams intersect, but will not change under the influence of a single focused light beam. This operation may be controlled by control system 63, shown in FIG. 1, which may comprise, for example, a computer system. Control system 63 may interact with laser 42, laser 50, as well as mirror 46 and mirror 54.

Alternative illumination schemes may be employed such as two-dimensional (2-D) arrays of lasers positioned on adjacent sides of the body. Similarly, 2-D arrays of LEDs may also be positioned on adjacent sides of the photosensitive material for directing the light and tracing the respective waveguides.

In the embodiment illustrated in FIG. 1, the optical fibers and the ports appear to lie in a common plane. However, it is contemplated herein that the optical fibers and the ports lie in three dimensions. In such an arrangement, care may be taken to ensure that when connections are made, the traces or waveguides do not intersect and interfere with one another. In some constructions it may be possible to position the ports so that interference between the connections is easily avoided. During construction of the waveguides, control system 63 may direct the particular waveguide being written so that it does not cross or intersect an existing waveguide. In addition, it is possible to direct the waveguide being written to cross or intersect an existing waveguide at any particular angle. It is preferable however, for the waveguides to cross at an angle that minimizes cross-talk or intersection loss. For example, if the angle of intersection is small, there is a greater chance for cross-talk and intersection loss than if the angle of intersection is greater. In particularly preferred embodiments where waveguides do cross or intersect, the angle of intersection is about 90°. However, in other embodiments, the angle of intersection may be between about 90° and 45°. In other embodiments, it may be between about 45° and 20°. However, the angle of intersection of crossed waveguides is not limited to the ranges specified. The invention contemplates any angle of intersection. Furthermore, in some situations it may be desirable to allow the waveguides to cross or intersect, due to size constraints, or even where cross-talk and intersection loss is desired.

It the exemplified embodiment, path 56 is shown traced between upper fiber 22 on face 18 to lower fiber 40 on face 20, traversing all other traces in the body. This requires movement of the trace or waveguide out of the plane of the other traces in order to cross without interference. Trace or waveguide 58 extends directly between fiber 24 on side 18 to fiber 34 on side 20, which may lie in a common plane with the respective ports. Waveguide 48 is the one shown in the process of being formed in the illustration. Another waveguide 60 is shown formed between fiber 28 and fiber 32. This waveguide crosses three other waveguides between the ports. Finally, waveguide 62 extends from the fiber 30 to the fiber 36, crossing two other waveguides.

The switch structure as described enables the switch to be changed on an "as needed" basis. Assuming that one side of the switch (for example, the left side in FIG. 1) is the input, any one of the inputs can be connected to any one of the outputs that is available. Once a connection is no longer required, it may be erased by any one of a number of ways. For example, the waveguides may be erased by blanket exposure of a different wavelength, polling with an external field, or waiting a predetermined amount of time until the waveguides naturally fade. In one embodiment, the waveguide may not fade until erased by an erasing means. FIG. 1 shows an exemplary erasing means 64.

In another embodiment, the waveguide may fade naturally within a predictable period of time, for example one second. In this embodiment, the waveguides could be rewritten, or refreshed every second in order to maintain the switch. In this way the user could determine whether the refresh rate should or should not coincide with the fade rate of the waveguides, to accomplish a stable switch, or one that changes with varying frequency.

Figure 2:
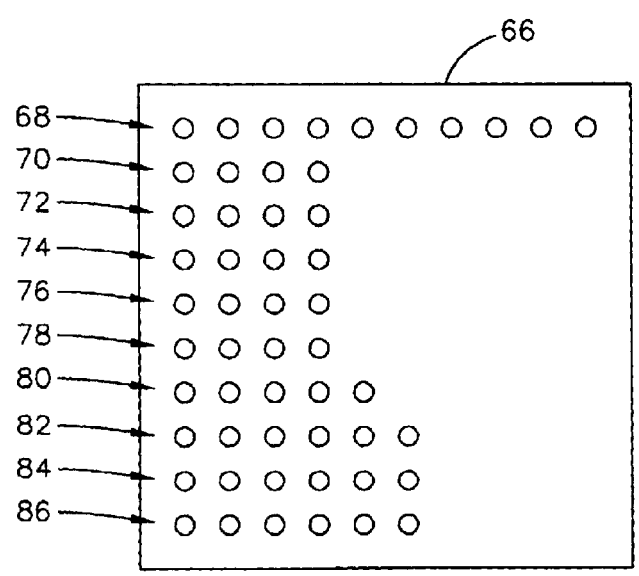
FIG. 2 is a plan view of one surface of a photosensitive body according to one embodiment of the invention.

The present invention therefore enables the construction of three-dimensional (3-D) switching structures having a high number of inputs and outputs. Referring to FIG. 2, an end view of a three-dimensional switching assembly is illustrated wherein multiple rows and columns of ports are shown. While only ten rows and columns are shown, an array may be formed with as many as thirty rows and thirty columns, yielding approximately 1000 inputs and outputs. This is a significant advantage over the typical 2-D array. The illustrated embodiment shows a photosensitive body 66 having vertically spaced horizontal rows 68, 70, 72, 74, 76, 78, 80, 82, 84 and 86. Any one of the ports in row 68 may be connected to any port in any one of any other rows on a different surface of the body. In addition, any one of the ports in row 68, for example, may be connected to any port in any one of any other rows on the same surface of the body. Thus, a huge number of interconnections can be made with such a construction. It will be apparent that the columns and rows may vary and be unequal in number. Although it is preferred that each single input will have a waveguide to a single output, it is also contemplated herein that a single input could have a waveguide coupled to more than one output, if desired.

It should be understood that the terms "light" and "optical" as used herein do not limit them to wavelengths in the visible spectrum. Two separate laser sources are shown in FIG. 1, but satisfactory results may be achieved with a single laser and appropriately placed optical devices (splitters or reflectors) to create and control two distinct light beams within the substrate.

While the invention has been illustrated and described by means of specific embodiments it is to be understood that numerous changes and modifications maybe made thereto without departing from the scope of the invention as defined in the appended claims.

What is claimed is:

1. An optical switch comprising:
   a photosensitive substrate having a plurality of surfaces;
   at least one inlet port in one of said plurality of surfaces and at least one outlet port in another of said plurality of surfaces of said substrate;
   a source of at least two light beams; and
   a means for focusing said light beams at a selected line of intersection within said substrate, said line of intersection being drawn between one inlet port and one outlet port, thereby creating a waveguide in the photosensitive substrate corresponding to said line of intersection.

2. The optical switch of claim 1, wherein there are a plurality of said inlet ports and a plurality of said outlet ports in a plurality of planes of said substrate.

3. The optical switch of claim 1, wherein said source of light beams is at least one laser.

4. The optical switch of claim 1, wherein said source of light beams is at least one LED.

5. The optical switch of claim 3, wherein said light beams are focused on said substrate from spaced locations.

6. The optical switch of claim 4, wherien said light beams are focused on said substrate from spaced locations.

7. The optical switch of claim 1, further comprising at least a pair of mirrors for directing said light beams to a point of intersection within said substrate.

8. The optical switch of claim 1, wherein said photosensitive substrate exhibits a larger change of index of refraction when exposed to two intersecting light beams of different wavelengths than when exposed to a single light beam.

9. The optical switch of claim 1, wherein said photosensitive substrate exhibits a larger change of index of refraction when exposed to two intersecting light beams of the same wavelength than when exposed to a single beam.

10. The optical switch of claim 1, further comprising means for erasing said waveguide in said substrate.

11. The optical switch of claim 1, further comprising optical fibers coupled to said inlet ports and said outlet ports.

12. The optical switch of claim 11, wherein said inlet ports and said outlet ports are spaced at least 125 microns apart on the surface of said substrate.

13. The optical switch of claim 1, wherein said line of intersection connects one inlet port with at least one outlet port.

14. The optical switch of claim 1, wherein said line of intersection connects one outlet port with at least one inlet port.

15. The optical switch of claim 1, wherein said photosensitive substrate has an index of refraction which is light sensitive.

16. An optical switch comprising:
   a photosensitive substrate having at least one surface;
   at least one inlet port in a surface and at least one outlet port in a surface of said substrate;
   a source of one light beam;
   a means for splitting said light beam into at least two light beams;
   a means for focusing said light beams at a selected location line of intersection within said substrate, said line of intersection being drawn between one inlet port and one outlet port, thereby creating at least one waveguide in the photosensitive substrate corresponding to said line of intersection.

17. The optical switch of claim 16, wherein at least one inlet port is in one surface and at least one outlet port is in the same surface of said substrate.

18. The optical switch of claim 16, wherein the means for focusing comprises a control system.

19. The optical switch of claim 16, wherein at least two waveguides cross or intersect at an angle.

20. The optical switch of claim 19, wherein the angle at which said at least two waveguides cross or intersect is selected from the group consisting of about 90°, about 45° to 90°, and about 20° to 90°.

21. The optical switch of claim 16, wherein said photosensitive substrate has an index of refraction which is light sensitive.

22. A method of forming a waveguide in a substrate comprising:
   selecting a three-dimensional photosensitive substrate having a plurality of planar surfaces, said photosensitive substrate comprising a plurality of inlet ports in one of said plurality of surfaces and a plurality of outlet ports in another one of said plurality of surfaces;
   providing a source of at least two light beams; and
   focusing said light beams at a selected line of intersection within the substrate drawn between one inlet port and one outlet port to change the refractive index of the photosensitive substrate at said line of intersection, thereby creating a waveguide in the substrate corresponding to the line of intersection.

23. The method of claim 22, further comprising the step of erasing said waveguide.

24. The method of claim 23, wherein the sequence of steps is repeated to refresh said waveguide.

25. The method of claim 22, wherein the sequence of steps is repeated to create additional waveguides between said inlet ports and said outlet ports.

26. The method of claim 22, wherein said focusing is accomplished by a control system.

27. The method of claim 22, wherein said photosensitive substrate has an index of refraction which is light sensitive.

* * * * *